April 10, 1962 R. C. P. HINTON 3,029,314

PARTY LINE DETECTOR CONNECTOR

Filed Nov. 12, 1957 2 Sheets-Sheet 1

Inventor
RAYMOND C. P. HINTON
By Philip M. Bolton
Attorney

April 10, 1962 R. C. P. HINTON 3,029,314

PARTY LINE DETECTOR CONNECTOR

Filed Nov. 12, 1957

2 Sheets-Sheet 2

| TRUNK | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| X | I | I | I | I | II | II | II | II | III | III | III | III | IV | IV | IV | IV | V | V |
| Y | D | C | B | A | D | C | B | A | D | C | B | A | D | C | B | A | D | C |

Inventor
RAYMOND C.P. HINTON
By Philip M. Bolton
Attorney 3,029,314

PARTY LINE DETECTOR CONNECTOR

Raymond C. P. Hinton, Teaneck, N.J., assignor to International Telephone and Telegraph Corporation, Nutley, N.J., a corporation of Maryland Filed Nov. 12, 1957, Ser. No. 695,637
17 Claims. (Cl. 179—17)

This invention relates to telephone systems and more particularly to improvements in systems for using common central office equipment with a plurality of trunks.

In multi-party identification arrangements used in automatic ticketing systems, it has been the practice to provide individual detection devices, for each of the incoming trunks to operate with an identification frequency tone generator located at each of the stations on the line. Such a system is disclosed in the patent application entitled "Party Line Identification System," by W. Hatton, Serial No. 451,791, filed August 24, 1954, now Patent No. 2,889,410. This scheme allows for an increase in the number of identifiable stations on a party line over the heretofore number of such identifiable stations. This arrangement, however, does have some undesirable economic aspects. It is apparent that the amount of equipment necessary at a central office to provide a detector for each line is substantial and therefore the cost of such equipment is quite high. The use of common detector equipment at the central office for a plurality of lines is not a simple answer because of the necessity of high speed switching means and of control means to enable a sharing of the equipment without interference with a high speed switching operation. To overcome these related problems the present invention has been made.

An object of the present invention is to provide an improved means for sharing common central office equipment.

Another object of the present invention is to provide a high speed switching means which responds to a dial pulse appearing on a line to connect the common equipment to the line with the sensing of the initial dial pulse.

Another object of the present invention is to provide a lockout circuit to permit only one line at a time to use the common equipment.

Another object of the present invention is to provide a release circuit to release the common equipment as soon as the station calling has been identified.

In accordance with a main feature of the present invention there is provided for each line a control relay responsive to a dial pulse and a switching means which is controlled by the relay, coupling the common equipment with the line, whereby this common equipment is connected to the line in response to the initiation of dial pulses on the line.

Another feature of the present invention provides a diode matrix lockout control circuit coupled to every switching means control circuit to enable a line using the common equipment to render all of the other lines incapable of seizing the common equipment.

Another feature of the present invention is the provision of a gas tube release circuit which is fired by a signal from the common detector equipment when the calling station has been identified. Conduction through the gas tube shifts the potential condition of the control circuit, releasing the common equipment for further use immediately upon the verification of a station identification.

Another feature of the present invention is the provision of a parallel circuit with one path through a control relay having a predetermined return time to insure that the party will be identifiable at the first dial pulse to which said control relay responds during a time when its associated switching means is not locked out.

The foregoing and other objects and features of this invention and the manner of attaining them will become more apparent and the invention itself will be best understood by reference to the following description of an embodiment of the invention taken in conjunction with the accompanying drawings comprising FIGS. 1 and 2, wherein.

Figure 1:
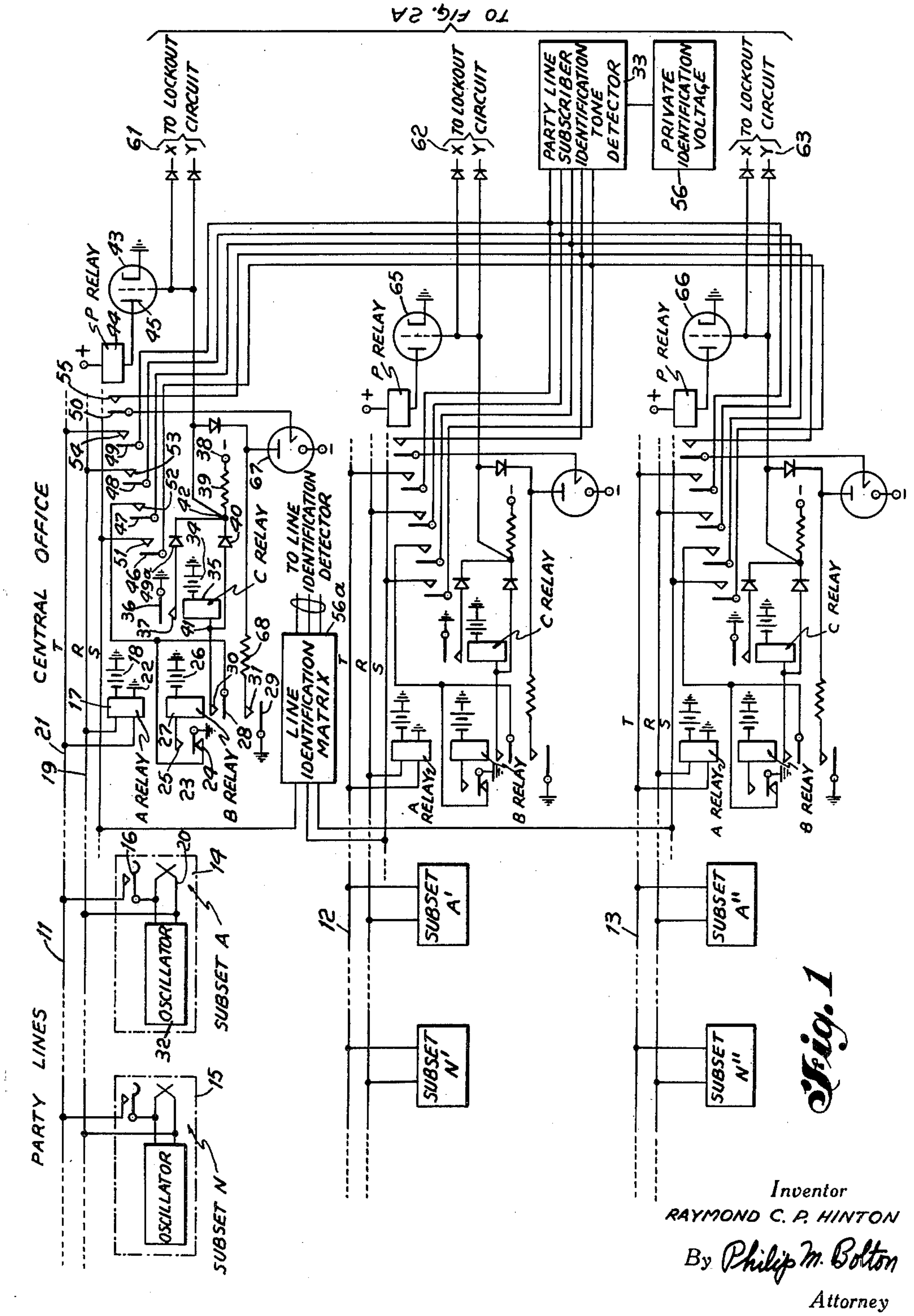
FIG. 1 is a schematic and block diagram showing the central office common detector equipment connecting arrangement.

Referring specifically to FIG. 1 there are three party lines 11, 12 and 13. The three party lines are shown for the purpose of the following discussion but obviously there could be and usually are more than three party lines connected to a central office. At party line 11 there are shown two subsets, subset A at 14 and subset N at 15. The connection of these subsets to the partly line 11 is typical for the party lines of the system and it is understood that subsets A' and N' of party line 12 and subsets A'' and N'' of party line 13 are identical. When the receiver of subset A, 14, is lifted the receiver contact points 16 close to provide a circuit to energize the "A" relay 17. The circuit is from the battery 18 through the A relay 17, the ring line 19, the dial contacts 20, the receiver contacts 16, through the trip line 21, through the A relay 17 to ground 22. When the A relay is energized the movable contact 23 transfers from the back contact 24 to the front or energized contact 25. A circuit, now, from the battery 26, through the B relay 27, front contact 25 and transferred movable contact 23 to ground causes the B relay to be energized. When the B relay is energized the movable contacts 28 and 29, respectively, transfer to make a connection with the front contacts 30 and 31. When the subscriber begins to dial, the dial contacts 20 are separated eliminating the short circuit path across the oscillator 32. The oscillator 32, with the contacts 20 open, passes an identification frequency signal to the lines 19 and 21. The frequency identification tone, generated by the oscillator 32 and transmitted on the lines 19 and 21, subsequently enables the party line subscriber identification tone detector equipment 33 to identify the subset A.

The tone detector equipment 33 can be any well-known circuit matrix of frequency responsive devices each respectively tuned to a particular different subscr ber's frequency identifying tone on any one party line. Examples of tone detectors which might be used are those shown in the above-mentioned Hatton application and the application entitled "Party Line Subscriber Ident fier," by Herbig et al., Serial No. 684,140, filed September 16, 1957. The breaking of the contacts 20, which initiates the first dial pulse, simultaneously causes the A relay 17 to become de-energized with the resultant transferal of the movable contact 23 to the back contact 24. The B relay 27 is designed and adjusted such that the transfer contacts 28 and 29 have a predetermined delayed return time which enables the contacts 28 and 29 to remain transferred for a short period of time after the B relay 27 has been de-energized. The B relay 27 is of the type found and discussed in the text book "The Design of Switching Cirtuitry" by Keister, Ritchie and Washburn, published by Van Nostrand, 1951. During this short period of t me when the transfer contacts 28 and 29 are in connection, respectively, with the front contacts 30 and 31 there is a circuit completed from the battery 34 through the C relay 35, front contact 30, movable contact 28, through the back contact 24 and the movable contact 23 to ground which causes the C relay 35 to be energized. When the C relay becomes energized the movable contact 36 is transferred to make a connection with the front contact 37. In addition to the circuit to energize the C relay there is a parallel circuit operative during the period of time when the transfer contact 28 has not returned which runs from the negative reference potential 38 through the resistance 39, diode 40 to common point 41, through the closed contacts 30, 28 and the closed contacts 24, 23 to ground. Prior to the completion of the parallel circuit just described the point 42 was held at the same negative potential as the reference potential 38. With the current flow through the resistance 39 taking place in accordance with the completion of the parallel circuit just described, the point 42 is made more positive which causes the triode 43 to conduct. As insurance the relay points 36 and 37 have been added to complete a circuit from a negative reference potential 38 through 42 through the diode *49a*, closed contact 37 and 36 to ground.

The C relay remains energized during the dial pulse train so that the path described holds point 42 more positive during this pulse train time. Previous path described holds point 42 more positive only during the time relay A is released but the importance of this first described path is that it is made earlier than the other path by a time equal to the operating time of the "C" relay. If we did not do this, the detector would not be connected to the line until almost at the end of the first dial pulse and we would not detect the frequency occurring during the first pulse since the operating time of the C relay is almost equal to one of the dial pulses. The C relay 35 is also of the adjustable variety described in connection with the B relay 27 and there is a predetermined delayed return time for the movable contact 36 so as to keep the points 36 and 37 closed for a short period of time after the C relay has been de-energized. The addition of the points 36 and 37 to complete the last circuit described insures that if the subscriber's dialing operation provides a single dial pulse which should in turn, through the circuitry described above, cause the triode 43 to conduct, the triode 43 will have a positive bias applied to the grid for a longer period of time through the circuit of the relay contacts 36 and 37 than would be available through the parallel circuit of the "B" and "A" relay points.

Causing the triode 43 to conduct is one of the basic steps in the operation of the system. When the triode 43 conducts, the P relay 44, which is coupled to the anode 45 of the triode 43, is energized. When the P relay 44 becomes energized the movable contacts 46, 47, 48, 49 and 50 are transferred to be connected, respectively, with the front contacts 51, 52, 53, 54 and 55. The trip line and the ring line are coupled to the detector device 33, respectively, through the closed contacts 49, 54 and 48, 53. The circuits through these closed contacts 49, 54 and 48, 53 enable the frequency tone from the oscillator 32 to be received by the common detector equipment 33. The back points of the A relay 24 in connection with 23 complete another circuit through the P relay contacts 47, 52 to the common detector equipment to insure that the frequency identification tone is received only when the transfer contact of the A relay is connected to the back contact. A more complete description of this operation and reasons therefore is described in the above-mentioned copending application entitled "Party Line Subscriber Identifier" by Herbig et al. A signal from the private identification voltage source 56 through the closed P relay contacts 51, 46 enables the common detector equipment 33 to identify the party line 11 through the matrix *56a*. The matrix operation for the identification of a line of this type is fully described in the above-mentioned copending application by Herbig et al.

Figures 2A, 2B:
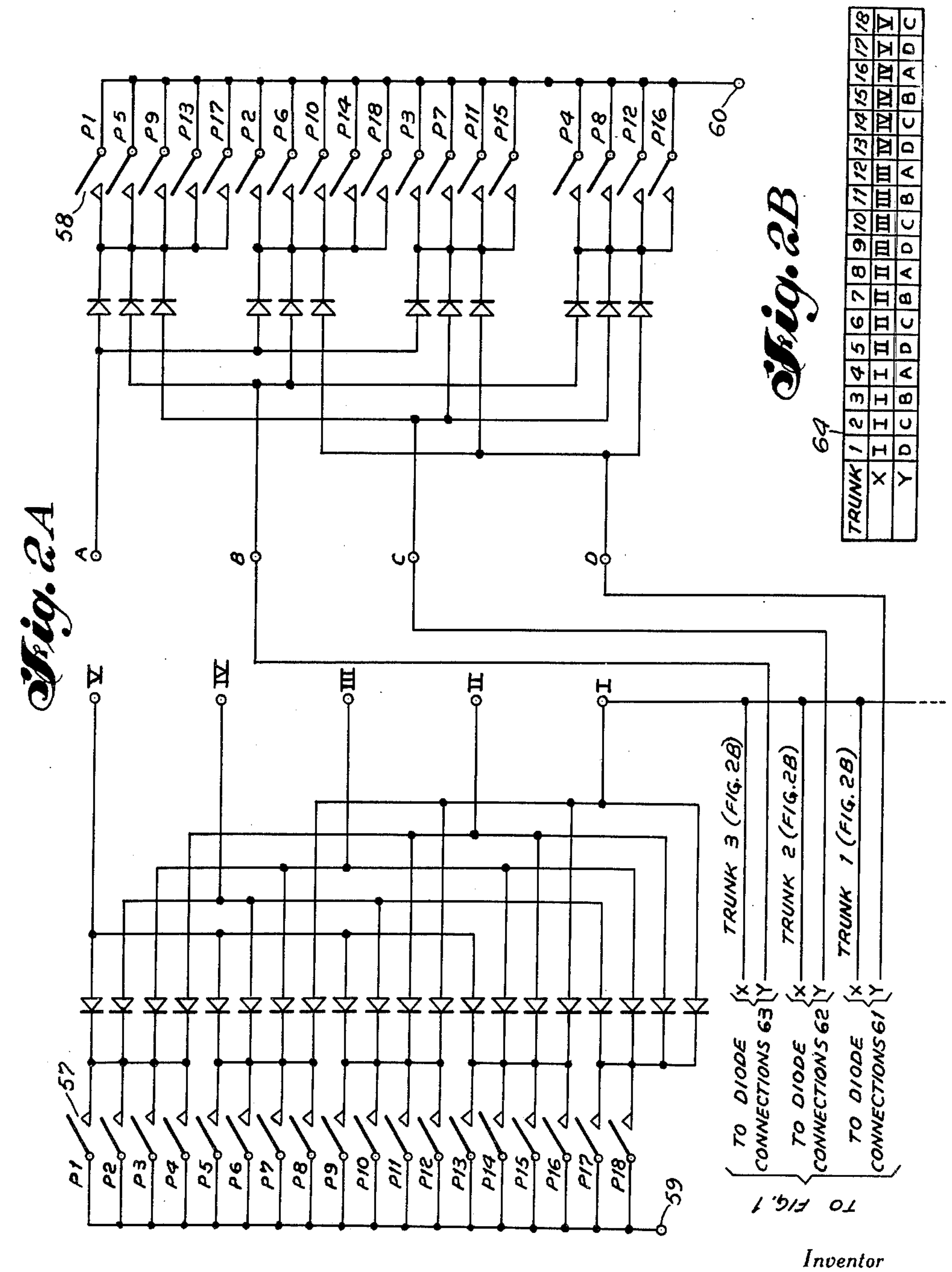
FIG. 2A is a schematic of the lockout circuit.
FIG. 2B is a table designating connections of trunk lines to the lockout circuit.

In FIG. 2A there is shown a schematic of the lockout control circuit. Let us assume for the moment that the P relay 44, FIG. 1 is considered as P1 and therefore when it is energized as described before it closes the contacts shown in FIG. 2A as 57 and 58. With careful tracing of the matrix circuitry of FIG. 2A with the contacts 57 and 58 closed, it will become apparent that the negative reference potential at 59 will appear at the terminals II, III, IV and V. In a similar fashion the negative reference potential 60 will appear at the terminals identified A, B and C. The lockout control circuitry shown at FIG. 2A will take care of 18 trunk lines. The X and Y terminals of the lockout circuits for the three trunk lines of FIG. 1 shown at 61, 62 and 63 along with 15 other trunk lines can be connected to the lockout control circuit of FIG. 2A according to the Table 64, shown on FIG. 2B. In our assumption above we assumed that the P relay 44 was the first trunk and therefore cause the points 57 and 58 of FIG. 2A to be closed. From the Table 64 of FIG. 2B we find that the X and Y leads of the lockout circuit 61 of FIG. 1 should be connected to the terminals I and D of FIG. 2A. As discussed above the terminal's II, III, IV, V and A, B, and C all are held at a negative potential with the closing of the points 57 and 58, and therefore if any other circuit attempts to cause its respective triode, such as triode 65 or 66 of FIG. 1 to conduct, the grids of these triodes will be held to a cutoff negative potential. When the subscriber has been identified and there has been a verification by, for instance, the "2 out of 5" check, which is described in the above text by Keister, Ritchie and Washburn, a signal is transmitted from the common detector equipment 33. The subscriber identification verification signal is passed through the closed points 55 and 50 of FIG. 1 to fire the gas tube 67. When the gas tube 67 fires, the circuit through the gas tube 67 resistor 68, closed relay points 31, 29 to ground, causes a negative potential bias to appear at the grid of the triode 43 and render the triode 43 non-conducting. When the triode 43 stops conduction the P relay 44 is de-energized and the movable contacts 46 to 50 return to their de-energized positions. The common detector equipment 33 has now been removed from the party line 11 and is available to be used to identify a subscriber for instance on the party lines 12 or 13 in a fashion similar to that described above in connection with the identification of subset A.

A subsequent dial pulse from subset "A," after subset A has been identified, does not initiate another seizure of the common equipment. The contacts of "B" relay 27 remain closed from the commencing of the dialing pulses until the receiver is "hung up," which insures that the gas tube 67 will continue to conduct through the "B" relay contacts 31, 29 to ground and hence keep the "P" relay 44 from being re-energized. The contacts of the B relay 27 remain closed from the commencing of the dialing pulses until the receiver is "hung up" because, first, the B relay is energized so long as the A relay remains energized and, secondly, the B relay points remain closed because of their slow return action as described above during the time that the "A" relay is being energized and de-energized in response to the dial pulses.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a telephone system, a central office, a plurality of subscriber stations, a plurality of telephone lines each respectively connecting a number of said stations to said central office, common detector equipment located at said central office to identify each of said stations, switching circuit means located at said central office, and means responsive to a random dialing pulse of one of said stations on one of said lines to control said switching circuit means to connect said common detector equipment to said one of said lines for identification of said one of said stations.

2. In a telephone system, a central office, a plurality of subscriber stations, a plurality of telephone lines each respectively connecting a number of said stations to said central office, common detector equipment located at said central office to identify each of said stations, switching circuit means located at said central office, means responsive to a random dialing pulse of one of said stations on one of said lines to control said switching circuit means to connect said common detector equipment to said one of said lines for identification of said one of said stations, said common detector equipment providing an output signal upon identification of said one of said stations, and means located at said central office coupled, to said common detector equipment to disconnect said common detector equipment in response to said output signal.

3. In a telephone system, a central office, a plurality of subscriber stations, a plurality of telephone lines each respectively connecting a number of said stations to said central office, common detector equipment located at said central office to identify each of said stations, switching circuit means located at said central office, means responsive to a random dialing pulse of one of said stations on one of said lines to control said switching circuit means to connect said common detector equipment to said one of said lines for identification of said one of said stations, and means located at said central office responsive to said dialing responsive means to prevent the seizure of said common detector equipment in response to any other of said plurality of stations so long as said one station is using said common detector equipment.

4. In a telephone system, a central office, a plurality of subscriber stations, a plurality of telephone lines each respectively connecting a number of said stations to said central office, each of said stations having dial equipment to produce dial pulses on its associated one of said plurality of lines, common detector equipment located at said central office to identify each of said stations, a plurality of control relays located at said central office with one each coupled to an associated one of said lines, a plurality of switching means each having an input means, an output means and control means, each of said switching means having its input means coupled to an associated one of said lines, circuitry means coupling the respective output means of each of said switching means in parallel to said common detector equipment, means coupled to each of said lines responsive to a random dialing pulse of one of said stations on one of said lines to energize said control relay coupled to said one of said lines to activate its associated one of said control means to connect said common detector equipment to said one of said lines for identification of said one of said stations.

5. In a telephone system, a central office, a plurality of subscriber stations, a plurality of telephone lines each respectively connecting a number of said stations to said central office, common detector equipment located at said central office to identify each of said stations, a plurality of control relays located at said central office with one each assigned to an associated one of said lines, each of said subscriber stations having dial equipment to produce dial pulses on its associated line, means coupled to each line and responsive to a dial pulse to energize the corresponding relay assigned to such line, a plurality of switching means each having an input, output and control means, each of said switching means having its input means coupled to one of said lines, circuitry means coupling the respective outputs of each of said switching means in parallel to said common detector equipment, each of said control relays having circuitry means coupling the respective relay to the control means of one of said switching means to activate the switching means when said relay is energized to thereby connect said common equipment to an associated line through said switching means, said dial equipment of each station having dial contacts, said means responsive to a dial pulse including a first relay coupled across said line, said first relay having a back, front and movable contact, circuitry means to energize said first relay when said dial contacts are closed to transfer its movable contact to make connection with its corresponding front contact, a first reference potential source applied to said first relay's movable contact, a second relay having at least a back, front and movable contact, a second reference potential source means coupling the coil of said second relay between said second reference potential source and said first relay's front contact to energize said second relay when said first relay is energized, said second relay's movable contact being transferred to make connection with its corresponding front contact and remaining in said connected status for a predetermined period after said second relay has been de-energized, means coupling said second relay's front contact to its associated control relay, and means coupling said first relay's back contact to said second relay's movable contact to produce a circuit to energize said control relay when said first relay is de-energized and during said predetermined period.

6. In a telephone system, a central office, a plurality of subscriber stations, a plurality of telephone lines each respectively connecting a number of said stations to said central office, common detector equipment located at said central office to identify each of said stations, a plurality of control relays located at said central office with one each assigned to an associated one of said lines, each of said subscriber stations having dial equipment to produce dial pulses on its associated line, means coupled to each line and responsive to a dial pulse to energize the corresponding relay assigned to such line, a plurality of switching means each having an input, output and control means, each of said switching means having its input means coupled to one of said lines, circuitry means coupling the respective outputs of each of said switching means in parallel to said common detector equipment, each of said control relays having circuitry means coupling the respective relay to the control means of one of said switching means to activate the switching means when said relay is energized to thereby connect said common equipment to an associated line through said switching means, each of said switching means including a switching relay having a plurality of movable contacts and a plurality of corresponding front contacts, said input means being coupled to said front contacts, said output means being coupled to said movable contacts, said control means including a triode, each of said control relay circuitry means coupled to the grid of its corresponding triode, and the anode of said triode coupled to its corresponding switching relay coil to energize said switching relay when said triode conducts and de-energize said switching relay when said triode is non-conducting.

7. In a telephone system, a central office, a plurality of subscriber stations, a plurality of telephone lines each respectively connecting a number of said stations to said central office, common detector equipment located at said central office to identify each of said stations, each of said subscriber stations having dial equipment including a pair of dial contacts to produce dial pulses, each of said lines having a first relay located at said central office coupled across its corresponding line to be energized when said dial contacts are closed, each of said first relays having at least a back, front and movable contact, a first reference potential source coupled to said movable contact, second reference potential source, each of said lines having a second relay assigned thereto whose coil is coupled between its corresponding first relay's front contact and said second reference potential source to be energized when said first relay is energized, said second relay having at least a front and movable contact, said second relay's movable contact adjusted to remain transferred for a predetermined period after said second relay has been de-energized, each of said lines having a third reference potential source and series connected resistor coupled to its associated second relay's front contact, means coupling the respective movable contacts of each of said second relays to said first relay's back contact to provide a circuit from said third reference potential source to said first reference potential source through the connection of said second relay's movable and front contacts and said first relay's movable and back contacts, a plurality of switching means each having an input, output and control means, each of said switching means having its input means coupled to one of said lines, circuitry means coupling the respective outputs of each of said switching means in parallel to said common detector equipment, and circuitry means coupling respectively each of said second relay's front contacts to the associated control means of its associated switching means to activate said switching means when said circuit from said third reference potential source to said first reference potential source has been completed.

8. In a telephone system, a central office, a plurality of subscriber stations, a plurality of telephone lines each respectively connecting a number of said stations to said central office, common detector equipment located at said central office to identify each of said stations, a plurality of control relays located at said central office with one each assigned to an associated one of said lines, each of said subscriber stations having dial equipment to produce dial pulses on its associated line, means coupled to each line and responsive to a dial pulse to energize the corresponding relay assigned to such line, a plurality of switching means each having an input, output and control means, each of said switching means having its input means coupled to one of said lines, circuitry means coupling the respective outputs of each of said switching means in parallel to said common detector equipment, each of said control relays having circuitry means coupling the respective relay to the control means of one of said switching means to activate the switching means when said relay is energized to thereby connect said common equipment to an associated line through said switching means, a lockout control circuit, means coupling said lockout control circuit to each of the control means of said plurality of switching means to render only one of said switching means operative at any particular time.

9. A telephone system according to claim 8, wherein said lockout control circuit includes a first and second diode matrix arrangement with each having a plurality of input and output means, each of said first matrix output means coupled in combination with each of said second matrix output means to form a plurality of pairs of output means each combination being different one from the other, said switching means including a relay, a reference potential source coupled to each of said matrix input means, said input means each including front and movable relay contacts of an associated one of said switching mean relays to produce said reference potential at each of said output means combinations excepting the combination coupled to the line whose switching means has been activated, thereby rendering only said last-mentioned line capable of using said common detector equipment.

10. In a telephone system, a central office, a plurality of subscriber stations, a plurality of telephone lines each respectively connecting a number of said stations to said central office, common detector equipment located at said central office to identify each of said stations, a plurality of control relays located at said central office with one each assigned to an associated one of said lines, each of said subscriber stations having dial equipment to produce dial pulses on its associated line, means coupled to each line and responsive to a dial pulse to energize the corresponding relay assigned to such line, a plurality of switching means each having an input, output and control means, each of said switching means having its input means coupled to one of said lines, circuitry means coupling the respective outputs of each of said switching means in parallel to said common detector equipment, each of said control relays having circuitry means coupling the respective relay to the control means of one of said switching means to activate the switching means when said relay is energized to thereby connect said common equipment to an associated line through said switching means, a lockout control circuit, means coupling said lockout control circuit to each of the control means of said plurality of switching means to render only one of said switching means operative at any particular time, a plurality of station verification control means each assigned to one of said line, and means coupling each of said station verification control means to said common detector equipment and the control means of its corresponding switching means to render said switching means inoperative when a calling station on said associated line has been identified.

11. A telephone system according to claim 10, wherein said station verification control means includes a gas tube having a cathode, control element and an anode, said control element coupled to said common detector equipment, a first and second reference potential source, said cathode coupled to said first reference potential source, said anode coupled to said switching means control means and said second reference potential source to effect said control means when said gas tube is conducting to render said switching means inoperative.

12. In a telephone system, a central office, a plurality of subscriber stations, a plurality of telephone lines each respectively connecting a number of said stations to said central office, common detector equipment located at said central office to identify each of said stations, each of said subscriber stations having dial equipment including a pair of dial contacts to produce dial pulses, each of said lines having a first relay located at said central office coupled across its corresponding line to be energized when said dial contacts are closed, each of said first relays having at least a back, front and movable contact, a first reference potential source coupled to each said first relay's movable contacts, a second reference potential source, each of said lines having a second relay assigned thereto whose coil is coupled between its corresponding first relay's front contact and said second reference potential source to be energized when said first relay is energized, said second relay having at least a front and movable contact, said second relay's movable contact adjusted to remain transferred for a predetermined period after said second relay has been de-energized, each of said lines having a third reference potential source and series connected resistor coupled to its associated second relay's front contact, means coupling the respective movable contacts of each of said second relays to the corresponding said first relay's back contact to provide a circuit from said third reference potential source to said first reference potential source through the connection of said second relay's movable and front contacts and said first relay's movable and back contacts, a plurality of switching means each having an input, output and control means, each of said switching means having its input means coupled to one of said lines, circuitry means coupling the respective outputs of each of said switching means in parallel to said common detector equipment, and circuitry means coupling respectively each of said second relay's front contacts to the associated control means of its associated switching means to activate said switching means when said circuit from said third reference potential source to said first reference potential source has been completed, a plurality of third relays each of which is assigned to one of said lines, a fourth reference potential source, means coupling the coil of each of said third relays to the corresponding said second relay's front contact and said fourth potential source to respectively energize each of said third relays when its associated said second relay has been energized, each of said third relays having at least a front and movable contact, a fifth reference potential source coupled to said third relay's movable contact, means coupling said associated third reference potential source and series connected resistor to said third relay's front contact to provide a circuit from said third reference potential source to said fifth reference potential source through the connection of said third relay's movable and front contacts to insure said switching means activation.

13. In a telephone system, a central office, a plurality of subscriber stations each identifiable by a characteristic frequency tone, a plurality of telephone lines each respectively connecting a number of said stations to said central office, common detector equipment located at said central office including means responsive to said tone to identify each of said stations and means to identify each of said lines, switching circuit means located at said central office, and means responsive to a random dialing pulse of one of said stations on one of said lines to control said switching circuit means to connect said common detector equipment to said one of said lines for identification of said one of said lines and said one of said stations.

14. In a telephone system, a central office, a plurality of subscriber stations each identifiable by a characteristic frequency tone, a plurality of telephone lines each respectively connecting a number of said stations to said central office, common detector means located at said central office including means responsive to said tone to identify each of said stations and means to identify each of said lines, switching circuit means located at said central office, means responsive to a random dialing pulse of one of said stations on one of said lines to control said switching circuit means to connect said common detector equipment to said one of said lines for identification of said one of said stations, said common detector equipment providing an output signal upon identification of said one of said stations, and means located at said central office coupled to said common detector equipment to disconnect said common detector equipment in response to said output signal.

15. In a telephone system, a central office, a plurality of subscriber stations each identifiable by a characteristic frequency tone, a plurality of telephone lines each respectively connecting a number of said stations to said central office, common detector equipment located at said central office including means responsive to said tones to identify each of said stations and means to identify each of said lines, switching circuit means located at said central office, means responsive to a random dialing pulse of one of said stations on one of said lines to control said switching circuit means to connect said common detector equipment to said one of said lines for identification of said one of said lines and said one of said stations, and means located at said central office responsive to said dialing responsive means to prevent seizure of said common detector equipment in response to any other of said plurality of stations so long as said one station is using said common detector equipment.

16. In a telephone system, a central office, a plurality of subscriber stations each identifiable by a characteristic frequency tone, a plurality of telephone lines each respectively connecting a number of said stations to said central office, common detector equipment located at said central office to identify each of said lines and each of said stations, switching circuit means located at said central office, and means responsive to a random dialing pulse of one of said stations on one of said lines to control said switching circuit means to connect said common detector equipment to said one of said lines for identification of said one of said lines and said one of said stations, said common detector equipment including means responsive to said tone to identify said station, a source of identification signal coupled to said switching means and means coupled to said switching means responsive to said identification signal to identify said one line.

17. In a telephone system, a central office, a plurality of subscriber stations each identifiable by a characteristic frequency tone, a plurality of telephone lines each respectively connecting a number of said stations to said central office, common detector equipment located at said central office to identify each of said stations and each of said lines, switching circuit means located at said central office, means responsive to a random dialing pulse of one of said stations on one of said lines to control said switching circuit means to connect said common detector equipment to said one of said lines for identification of said one of said stations and said one of said lines, means located at said central office responsive to said dialing responsive means to prevent the seizure of said common detector equipment in response to any other of said plurality of stations so long as said one station is using said common detector equipment, said common detector equipment including means responsive to said tone to identify said one of said stations, a source of identification signal coupled to said switching circuit means, means coupled to said switching circuit means responsive to said identification signal to identify said one of said lines and means to provide an output signal upon identification of said one of said stations and said one of said lines, and means located at said central office coupled to said common detector equipment to disconnect said common detector equipment in response to said output signal.

References Cited in the file of this patent

UNITED STATES PATENTS

| | | |
|---|---|---|
| 2,283,610 | Mohr | May 19, 1942 |
| 2,672,515 | Barlow | Mar. 16, 1954 |
| 2,877,311 | Morris et al. | Mar. 10, 1959 |
| 2,889,410 | Hatton | June 2, 1959 |
| 2,928,904 | Morris | Mar. 15, 1960 |